United States Patent [19]

Adams

[11] Patent Number: 5,963,944
[45] Date of Patent: Oct. 5, 1999

[54] SYSTEM AND METHOD FOR DISTRIBUTING AND INDEXING COMPUTERIZED DOCUMENTS USING INDEPENDENT AGENTS

[75] Inventor: Robert Adams, Lake Oswego, Oreg.

[73] Assignee: Intel Corporation, Santa Clara, Calif.

[21] Appl. No.: 08/777,517

[22] Filed: Dec. 30, 1996

[51] Int. Cl.⁶ .................................................. G06F 17/30
[52] U.S. Cl. ............................ 707/10; 709/202; 707/104
[58] Field of Search ........................ 395/200.32, 200.47, 395/200.48, 200.49; 707/3, 8, 10, 102, 104; 709/202, 217, 218, 219

[56] References Cited

U.S. PATENT DOCUMENTS

| | | | |
|---|---|---|---|
| 4,956,774 | 9/1990 | Shibamiya et al. | 707/2 |
| 5,303,243 | 4/1994 | Anezaki | 371/9.1 |
| 5,337,360 | 8/1994 | Fischer | 380/23 |
| 5,341,478 | 8/1994 | Travis, Jr. et al. | 395/200.33 |
| 5,410,688 | 4/1995 | Williams et al. | 707/10 |
| 5,588,147 | 12/1996 | Neeman et al. | 395/601 |
| 5,655,081 | 8/1997 | Bonnell et al. | 395/200.32 |
| 5,684,984 | 11/1997 | Jones et al. | 707/10 |
| 5,689,706 | 11/1997 | Rao et al. | 707/201 |
| 5,694,594 | 12/1997 | Chang | 395/200.48 |
| 5,701,451 | 12/1997 | Rogers | 395/200.32 |
| 5,706,516 | 1/1998 | Chang et al. | 395/680 |
| 5,710,918 | 1/1998 | Lagarde et al. | 395/200.32 |
| 5,765,149 | 6/1998 | Burrows | 707/102 |
| 5,793,888 | 8/1998 | Delanoy | 382/219 |

OTHER PUBLICATIONS

S. Franklin, "Coordination without Communication", Institute for Intelligent Systems and Department of Mathematical Sciences University of Memphis, Nov. 4, 1996, pp. 1–6.

C. J. Petrie, "Agent–Based Engineering, the Web, and Intelligence", IEEE Expert Intelligent Agents Article, Stanford Center for Design Research, Nov. 4, 1996, pp. 1–9.

Udi Manber & Sun Wu, "GLIMPSE: A Tool to Search Through Entire File Systems," Oct., 1993.

Salton, "Automatic Text Processing," Ch. 8–10, 1989.

Salton/Mc Gill, "Introduction To Modern Information Retrieval," Ch. 3–6, 1983.

Hac, Anna; "A Distributed Algorithm for Performance Improvement Through File Replication, File Migration, and Process Migration"; IEEE Transactions on Software Engineering, vol. 15, No. 11, Nov. 1989.

Johnson, T. et al.; "Distributed Indices for Accessing Distributed Data"; Twelfth IEEE Symposium on Mass Storage Systems; 1051–9173/93 Dec. 1993.

Rio, Miguel et al.; "Cooperative Agents in Distributed Indexing and Retrieval"; IEEE International Conference on Intelligent Processing Systems, Oct. 28–31, Beijing, China; 0–7803–4253–4/97, Oct. 1997.

*Primary Examiner*—Mark H. Rinehart
*Assistant Examiner*—Marc D Thompson
*Attorney, Agent, or Firm*—Leo V. Novakoski

[57] ABSTRACT

A system is provided in which autonomous agents manage the distribution of data and index information among the nodes of a computer network. The system comprises a network of computer nodes, each of which includes a data store and an agent interface for execution of the autonomous agents. The autonomous agents move independently among the network nodes, using the agent interface at each node they visit to execute their functions. Various types of agents are employed to implement different functions in the system. Index agents transfer index fields to and from the data stores of the network nodes according to a transfer criterion that is biased to aggregate index blocks into index files on one or more network nodes. Replication agents replicate index files on different nodes to make the system robust against node loss. Balance agents break large index files into smaller subfiles, to prevent overloading any nodes of the network, and query agents locate and retrieve index file entries that match a query criterion. The different agent types manage index and data information on the network nodes without need for a central organizing computer.

39 Claims, 7 Drawing Sheets

SYSTEM AND METHOD FOR DISTRIBUTING AND INDEXING COMPUTERIZED DOCUMENTS USING INDEPENDENT AGENTS

BACKGROUND OF THE INVENTION

1. Technical Field

This invention relates to the field of data indexing and retrieval, and in particular to systems and methods for managing the data stored on computer networks and the indices used to track this data.

2. Background Art

Computer networks are capable of storing ever-increasing amounts of data. In order to manage this data effectively, these networks employ various indexing schemes to represent the stored data in a manner that facilitates information searching and retrieval. Currently available management schemes rely on a central computer to coordinate the distribution of indices and data among the computers of the network. The data and indices are typically distributed among a network of server computers, which can be accessed from other computers, e.g. personal computers, on the network.

One shortcoming of these conventional, centrally coordinated management schemes is that they do not scale well. That is, they cannot be expanded to accommodate the ever-increasing amounts of data available on computer networks without substantial modifications to the way the data and indices are handled. The overhead borne by the central computer for tracking and coordinating the distributed information impedes the efficiency with which these systems operate. This problem appears in the intranets used by organizations to store their data, and it is exacerbated where data from the much larger internet is stored and tracked by these intranets.

Another shortcoming of these distributed systems is that only relatively powerful server computers are used to store indices and data. Servers are used because they can store more information than personal computers, and this minimizes the number of computers that the managing computer must coordinate. However, confining the distributed information to servers ignores the substantial processing and storage power available on the many smaller computers that form the majority of nodes of a network.

Agents are available to scour the internet for data specified by a user. However, these agents merely locate and retrieve the specified data from network sites. They are not designed to manage, index, or distribute data and index files.

SUMMARY OF THE INVENTION

The present invention uses autonomous agents to manage the distribution of data and index information among the nodes of a computer network, eliminating the need for central coordination. In accordance with the present invention, each network node includes a data store and an agent interface for execution of the autonomous agents. The autonomous agents move independently among the network nodes, using the agent interface at each node they visit to execute their functions. The agent is an encoded script the function of which is to transfer index fields to and from the data stores of the network nodes according to a transfer criterion. The transfer criterion is biased so that index blocks of a type are aggregated onto a network node to form an index file for the type.

BRIEF DESCRIPTION OF THE DRAWINGS

The invention may be understood with reference to the following detailed description and the accompanying drawings.

DETAILED DESCRIPTION OF THE INVENTION

Figure 1:
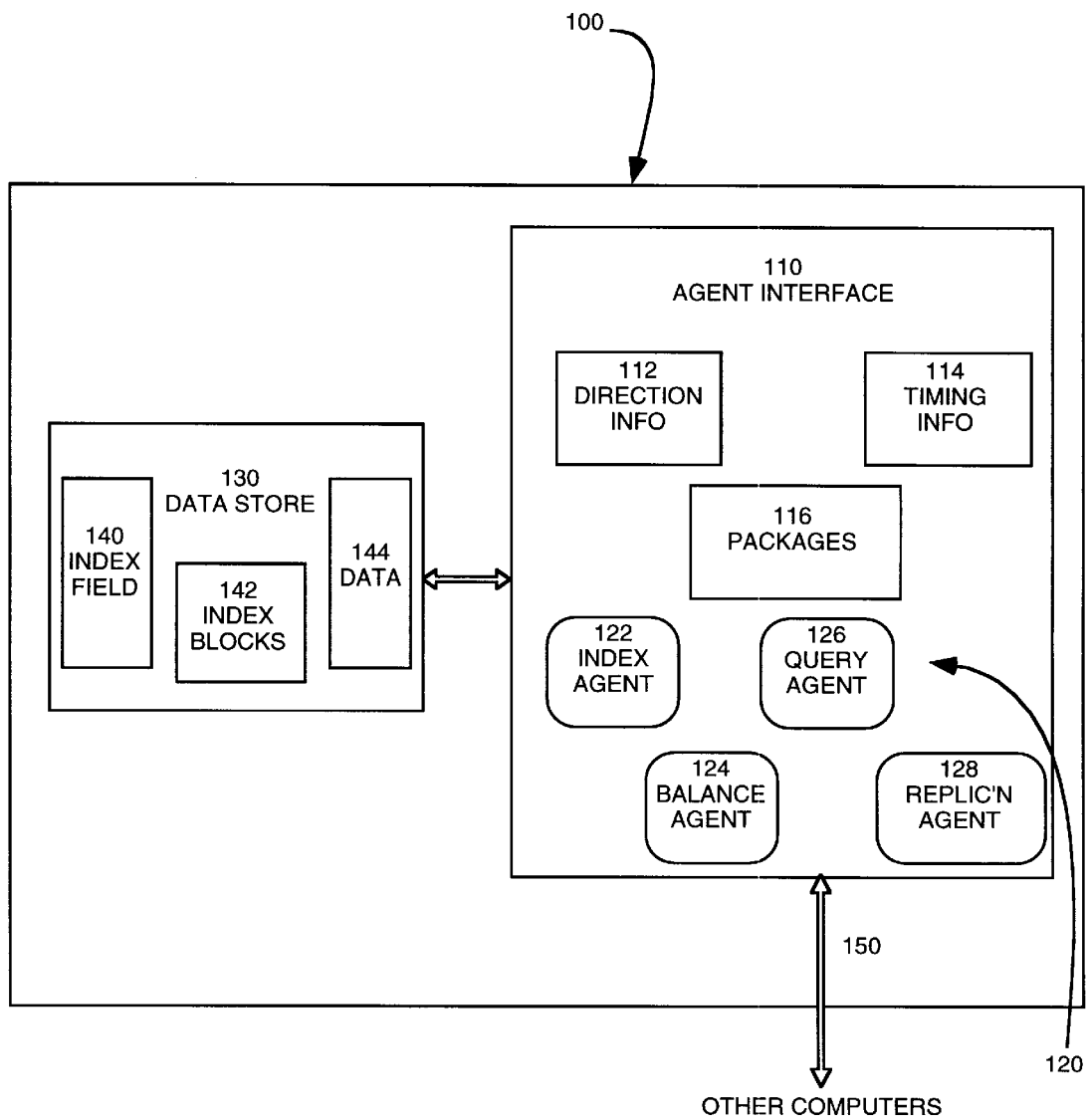
FIG. 1 is a block diagram of a computer node including the elements necessary to implement the present invention.

The present invention employs the uncoordinated activities of autonomous agents to provide a decentralized, scalable system for managing data and index information distributed among the nodes of a network. The emergence of a seemingly coordinated result (index/data management) from the uncoordinated activities of independent agents is referred to as stigmergy. Many examples of stigmergic activity occur in nature. One such example is the emergence of seemingly coordinated collecting activity from the independent actions of the ants of a colony, as each ant responds to the conditions in its immediate vicinity in a simple, predictable way.

For the purposes of this discussion, "agent" refers to an executable script program that uses specific interfaces to move among computing environments and to perform a specific function in the environments it visits. "Agent" may also refer to message packets that use interfaces to move among computing environments, where each interface implements multiple functions. In this case, data is transferred in the agent message packet along with an indication of which function is to be applied to the data. The role of the executable script is thus served by the interface function indicated in the agent message packet.

In the present invention, the computing environments are the nodes of the computer network on which data is to be distributed, and the specific interfaces are agent interfaces associated with these network nodes. The network nodes may include specialized servers designed to handle a decentralized management function and general purpose computers, such as personal computers (PCs) and workstations. In one embodiment of the invention, the autonomous agents may be implemented as Java applets, in which case, the agent interface is a Java runtime environment.

One feature of the present invention is the aggregation of index blocks into index files by autonomous agents. The scripts executed by agents that perform this indexing function (index agents) are identical. The emergent coordination follows from the criterion that governs the transfer of index blocks between each index agent and the nodes that it visits. When this criterion is properly selected, the net effect of the autonomous agents' uncoordinated activities is to aggregate index blocks of the same type into an index file for the type. The index file is typically distributed over a limited number of network nodes, the actual number depending on the size of the file and the level of redundancy built into the system. The need for a central coordinating computer to identify, aggregate, and distribute the index data is thus eliminated. Since the size of the resulting system is no longer constrained by the overhead load on the central computer, the system is scalable.

In this discussion, "index" refers to a representation of a document set, the records of a database, or other information that may be organized for data retrieval. For example, in a database application, the index is the collection of index fields in the database, and in an electronic document set, the index comprises the set of terms used to represent the contents of the document set. In the latter case, the index terms may, for example, be derived from the document itself, selected from a lexicon, or provided by an expert system.

The term "index block" refers to data that identifies the value of an index field for a particular document or record. Alternatively, an index block may identify the values of multiple index fields for a document or record if the index fields are related. Index blocks are derived from a document or record by an indexing scheme. In the case of a document set, the value of an index field for a document may be a one or a zero, depending on whether or not the document includes the index term represented by the field. In the case of a set of records, the value of the index field is the value of the index field for a particular record. In both cases, an index field or a number of related index fields for the particular document or record determines the type of the corresponding index block. Indexing blocks of a given type are aggregated into index files for the type. Depending on its size, an index file may be located on a single node or distributed over several nodes to minimize the load on any one computer. As discussed below, index files are typically replicated as a hedge against loss of network nodes.

In addition to document sets and database records, other types of information may be analyzed into index blocks, e.g. index field, value pairs, for processing by the present invention. In the following discussion, "document" will be used to refer to document sets, data base records and these other types of indexable information. The various indexing schemes suitable for processing documents into index blocks are well known and are not discussed in greater detail here.

As noted above, index agents move among the network nodes, identify index blocks at the nodes, and transfer index blocks to other network nodes according to the transfer criterion employed. The net effect of these actions aggregates index blocks of a given type into index files at a relatively small number of network nodes, provided the transfer criterion is properly selected. According to one set of criteria, an index agent carrying an index block deposits it at a node with a probability that is proportional to the number of index blocks of the same type at the node. The index agent retrieves an index data block from a node with probability that is inversely proportional to the number index data blocks of the same type at the node.

The present invention may employ autonomous agents to accomplish functions in addition to the index function described above. For example, balance agents may be employed to ensure that the index at any one node does not become too large. In one embodiment of the invention, each balance agent determines the number of entries (index blocks) in the index files aggregated at each node they visit. If the number exceeds a maximum value, the balance agent splits the index file into two parts and transfers one of the partial index files to a different node.

Similarly, replication agents may be employed to replicate index files at multiple nodes of the network, in order to make the database more robust against the loss of nodes. This is especially important where, for example, the network nodes are personal computers, since these may be shut down when not in use. Query agents may be employed to retrieve data from the index files in response to a query, and to return the retrieved data to the node at which the query originated.

Because the present invention does not employ a central, coordinating computer, each agent determines which node it will visit next. The system may be implemented with each agent selecting its next destination in a random fashion. However, this not very efficient, particularly as the number of nodes on the network increases. A preferred embodiment of the present invention incorporates direction and time information from visiting agents into the agent interface of each node. This information provides hints to an agent visiting a node about which nodes it may visit next and how recently the agent last visited the current node. The hints given are determined by the state of the agent at the node. An agent's state is determined in part by the agent's function and whether the agent is carrying index data (block/file/file portion). If the agent is carrying index data, the agent's state also depends on the type of the index block it is carrying. This feature is discussed in greater detail below.

Referring now to FIG. 1, there is shown a block diagram of a computer node 100 suitable to function as a network node in accordance with the present invention. Node 100 comprises an agent interface 110 coupled to a data store 130. For purposes of illustration, data store 130 is shown including an index file 140, index blocks 142, and data 144. In general, a node may include all, some, or none of these different data types. For example, one purpose of the present invention is to aggregate index blocks 142 into index files 140, and it may not be necessary for every node of the network to include an index file 140 in its data store. Similarly, selected nodes, e.g. server nodes, may be earmarked to store document data.

Node 100 is also shown with four autonomous agents 122, 124, 126, 128 (collectively, agents 120) executing in agent interface 110. Four agents 120 are shown for illustration. The present invention does not require that any or all of agents 120 be present in node 100 at any specified time. Autonomous agents 120 include an index agent 122, a balance agent 124, a query agent 126, and a replication agent 128.

Agent interface 110 provides a runtime environment for agents 120, which it receives as message packets over a network communication channel 150. For this purpose, agent interface 110 includes an application program interface (API) package 116, which provides agents 120 with access to various resources of node 100. These resources include CPU time, data store 130, memory locations 112, 114, and network communication channel 150. Agents 122, 124, 126 use resources accessed through API package 116 to perform the functions they encode, i.e. aggregating index blocks, balancing the size of index files, and servicing queries, respectively. In one embodiment of the invention, agent interface 110 is a Java run time environment that has been extended by packages 116 to support agents, i.e. Java applets, having the various functions described herein.

Memory locations 112, 114 store direction and timing information, respectively, for use by agents 120 in determining their actions at node 100. In one embodiment of the invention, the direction information includes pointers to network nodes connected to node 100 that are likely to provide a path to a node holding an index file of a certain type. These pointers function as hints, specific to the state of an agent 120, about which links are more likely to let the agent complete its function. For example, the link from node 100 that is most likely to lead to the network node at which index blocks of a given type are being aggregated may be identified and re-enforced by tracking the links followed to node 100 by query agents 126 carrying retrieved index blocks of the specified type. Hints may also be re-enforced by identifying which network nodes connected to node 100 were taken by index agents 122 carrying the specified index block type.

Timing information 114 in the form of time-decaying markers left by various agents 120 that visit node 100 may also provide useful information to agents 120 that visit the node subsequently. For example, an index agent 122 carrying index block data (loaded agent) and sampling network nodes, may leave a time-decaying signal in memory store 114 to mark how recently it has been to node 100. If loaded index agent 122 revisits node 100 and samples store 114 before the signal decays, it will recognize that it has been to node 100 recently. If the decay time is selected to reflect, for example, the average time between data retrieval and deposits for an agent, an agent recognizing its own time marker at a node can assume that it already sampled the node with its current data load and need not sample the node's data store 130 again.

It is noted that agents 120 visiting node 100 may randomly select links to other network nodes. However, it is clearly more efficient to monitor the states of agents 120 that have previously visited node 100. Particularly for networks having large numbers of network nodes, this type of historical information may greatly enhance the efficiency with which the system operates. The use of direction and timing information in memory stores 112, 114, respectively, is discussed below in greater detail.

Figure 2:
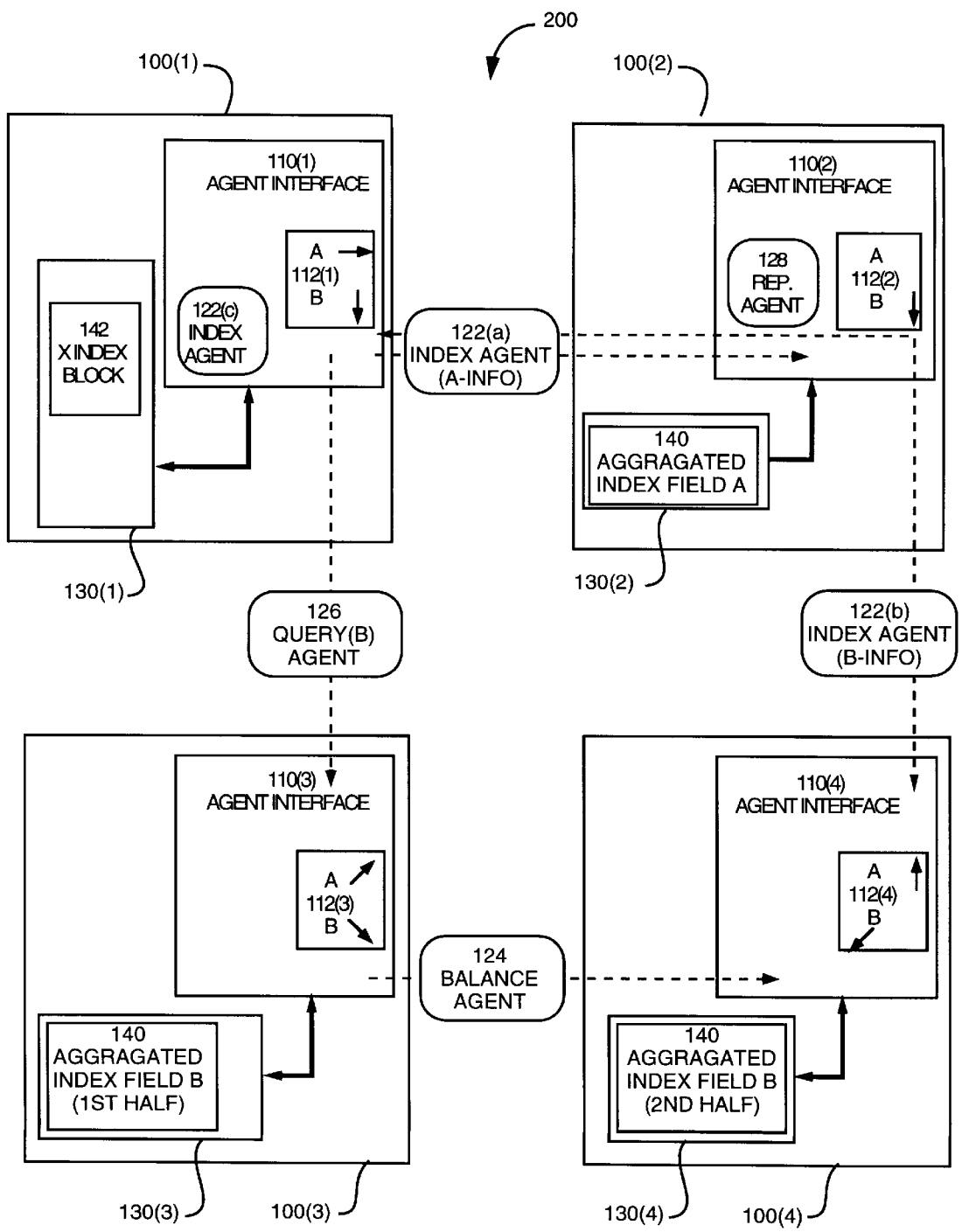
FIG. 2 is a block diagram of a computer network for implementing the data and index distribution system of the present invention.

Referring now to FIG. 2, there is shown a block diagram of a computer network 200 that implements the system of the present invention. Computer network 200 comprises computer nodes 100(1)–100(4) coupled through network links 150. Query agent 126, balance agent 124, and index agents 122(a), 122(b) are moving among nodes 100(1)–100 (4), while index agent 120(c) and replication agent 128 are executing in nodes 100(1) and 100(2), respectively. In the following discussion, reference numbers will not be indexed unless necessary to identify a specific one of nodes 100(1)–100(4) or its components.

Each of computer nodes 100 includes a direction memory location 112 in which direction hints (arrows) relating to index files of type A and B are stored. In the disclosed embodiment of system 200, direction hints point to other nodes 100 that are likely to lead to index files of type A or B. For example, index agent 122(a) has retrieved an A type index block from data store 130(1) (using a transfer criterion discussed below), read memory location 112(1) for a direction hint to index file A, and sent itself to node 100(2), in accordance with the direction hint. Similarly, index agent 122(b) has retrieved a B type index block from data store 130(1) and sent itself first to node 100(2) and then to node 100(3) in accordance with the direction hints in memory locations 112(1) and 112(2), respectively.

Another index agent 122(c) is executing in agent interface 110(1). Depending on the transfer criterion being implemented by index agents 122, index agent 122(c) may retrieve the X type index block and transfer it to a different node of computer system 200. By using appropriate criteria, the independent actions of index agents 122 ensure that index blocks 142 on any node in system 200 will aggregate at the nodes that hold the corresponding index files 140, e.g. nodes 100(2), 100(3), 100(4) in FIG. 2.

Query agent 126 represents a portion of a query generated at node 100(1) to identify documents that include non-zero B type index blocks among others. Query agent 126 has followed a direction hint in memory location 112(1) to computer node 100(3), in search of matches to a value for the B-type index field that has been specified in the query. When query agent 126 finds B type index files in nodes 100(3), 100(4), it compares the specified value with the entries (B-type index blocks) in the B-type index file to identify those documents having the specified value. Query agent 126 will re-enforce the direction hints to B index files in nodes 100(1), 100(3), and 100(4) when it returns to node 100(1) or sends another agent back to node 100(1) with the retrieved information.

Balance agent 124 is shown shifting data to node 100(4) to reduce the size of B type index file 140(3) in node 100(3). Replication agent 126 is executing in agent interface 110(2). Replication agent 126 ensures that there are sufficient copies of index files 140 to make system 200 robust against loss of one or more nodes. For example, replication agent 126 may be programmed to survey the nodes of computer system 200 and move a copy of any index files 140 that do not have at least one back-up copy to a different node. If B type index file 140 does not meet this redundancy criteria, it will be copied to two other nodes of the system to avoid loading any one node.

Figure 3:
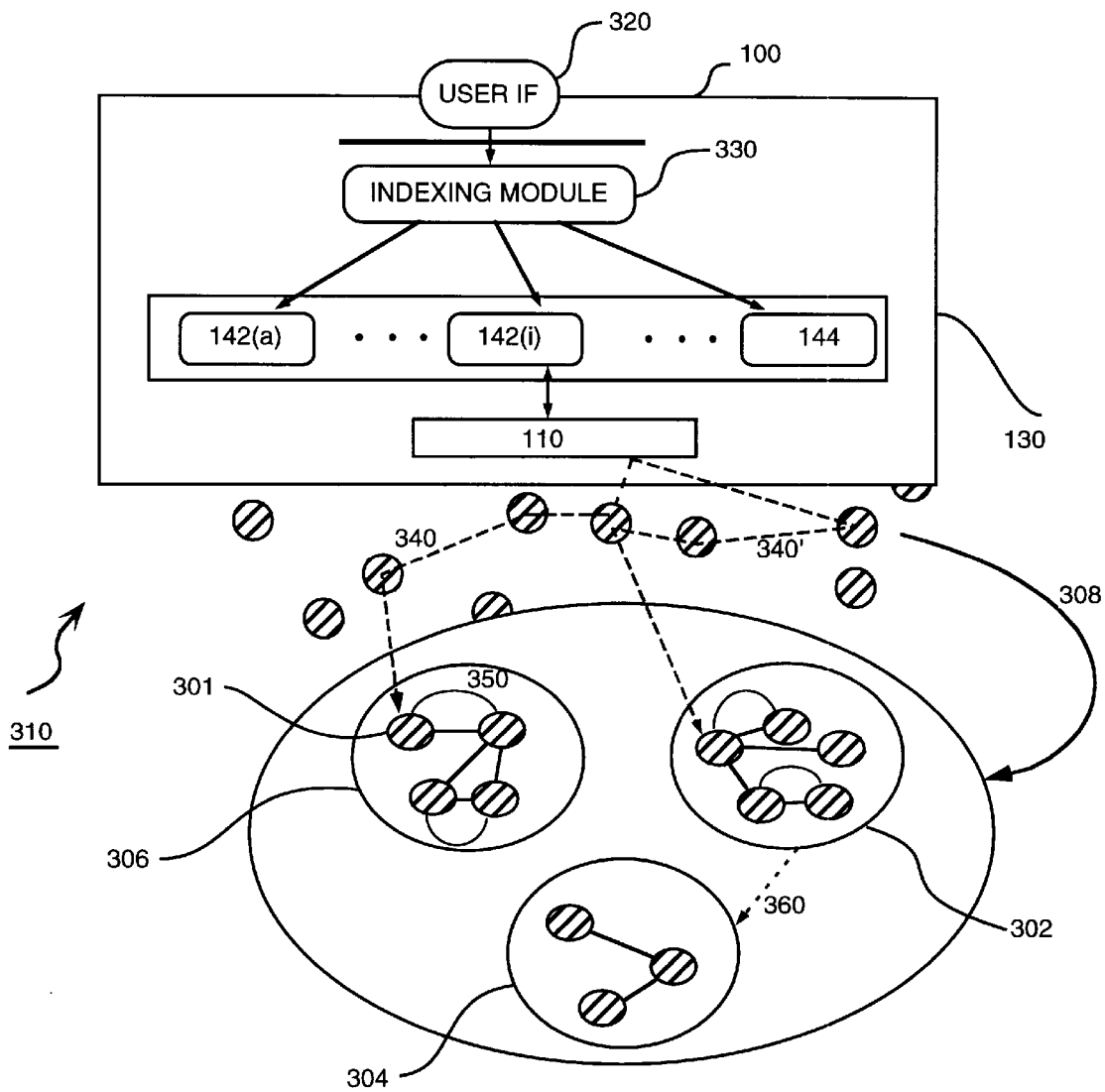
FIG. 3 is a schematic representation of a distributed index and database, managed in accordance with the present invention.

Referring now to FIG. 3, there is shown a schematic representation of a computer node 100 interacting with other nodes 308 of a computer network 310. Node 100 includes a user interface 320 for adding documents to the data distributed over computer network 310 or for initiating queries to the distributed data. A library module 330 includes software to generate index blocks 142(a)–142(j) and data 144 from the document being added to the data. Another part of library module 330 analyzes a query into its component index fields and generates a query agent 126 for each type of index file covered by the query. In one embodiment of the invention, documents satisfying the query are identified through index blocks 142 returned to library module 320 by query agents 126. Documents including each term specified in the query are identified by library module 330, using data returned to node 100. These documents can then be retrieved by library module 330. The document data itself may be distributed over the network or on selected server nodes using the methods described for the index data.

The paths of various autonomous agents 120 from node 100 through the rest of network 310 are indicated by broken lines 340, 340' between node 100 and a network nodes 308. The jagged appearance of broken lines 340 indicates the different nodes 308 visited by various autonomous agents 120, e.g. index agents 122, query agents 126, implementing their scripts. For example, an index agent 122 loaded with a j-type index block may visit a number of different nodes before reaching a node 301 holding the corresponding index file. Curved arrows 350 indicate the action of balance agent 124, which split large index files among different hosts (nodes), to minimize the burden on any one computer node 308. Dashed arrows 360 indicate the action of replicating agents 128, which generate replicas of whole index files on different computer nodes as a hedge against the loss of any one computer node. For example, one replica of aggregated index file (i) has been divided among five different nodes 302, a second replica has been divided among three different nodes 304, and a third replica as been divided among four different nodes 306.

The distribution of index blocks among network nodes 308 in system 310 is not static. New index blocks are added to index file (i) as additional documents are entered into the database. By implementing probabilistic transfer criteria in, e.g. index agents 122, index files 140 for the same type index block 142 may be aggregated on more than one node and may even comprise different index blocks. Index agents 122 may move these index blocks between the different nodes and may even remove an index block from a node storing its corresponding index file to a node that does not hold an appropriate index file. These latter types of transfers are attributable to the probabilistic transfer criteria employed, but will happen infrequently with well chosen transfer criteria.

As noted above, autonomous agents 120 are programmed to transfer themselves among the nodes of a computer network and implement the functions encoded in their scripts at the nodes they visit. The functions are implemented so that the goal, e.g. aggregating index blocks of a given type onto a relatively small number of node locations, is accomplished through the collective, uncoordinated actions of agents 120.

In the case of index agents 122, this is accomplished through the criterion employed to determine whether to transfer an index block between its data store and that of the node it is visiting. In particular, the criterion employed biases index agents to retrieve index blocks from those nodes on which relatively few index blocks of the same type are located and to deposit index blocks on those nodes having relatively more index blocks of the same type.

Figure 4:
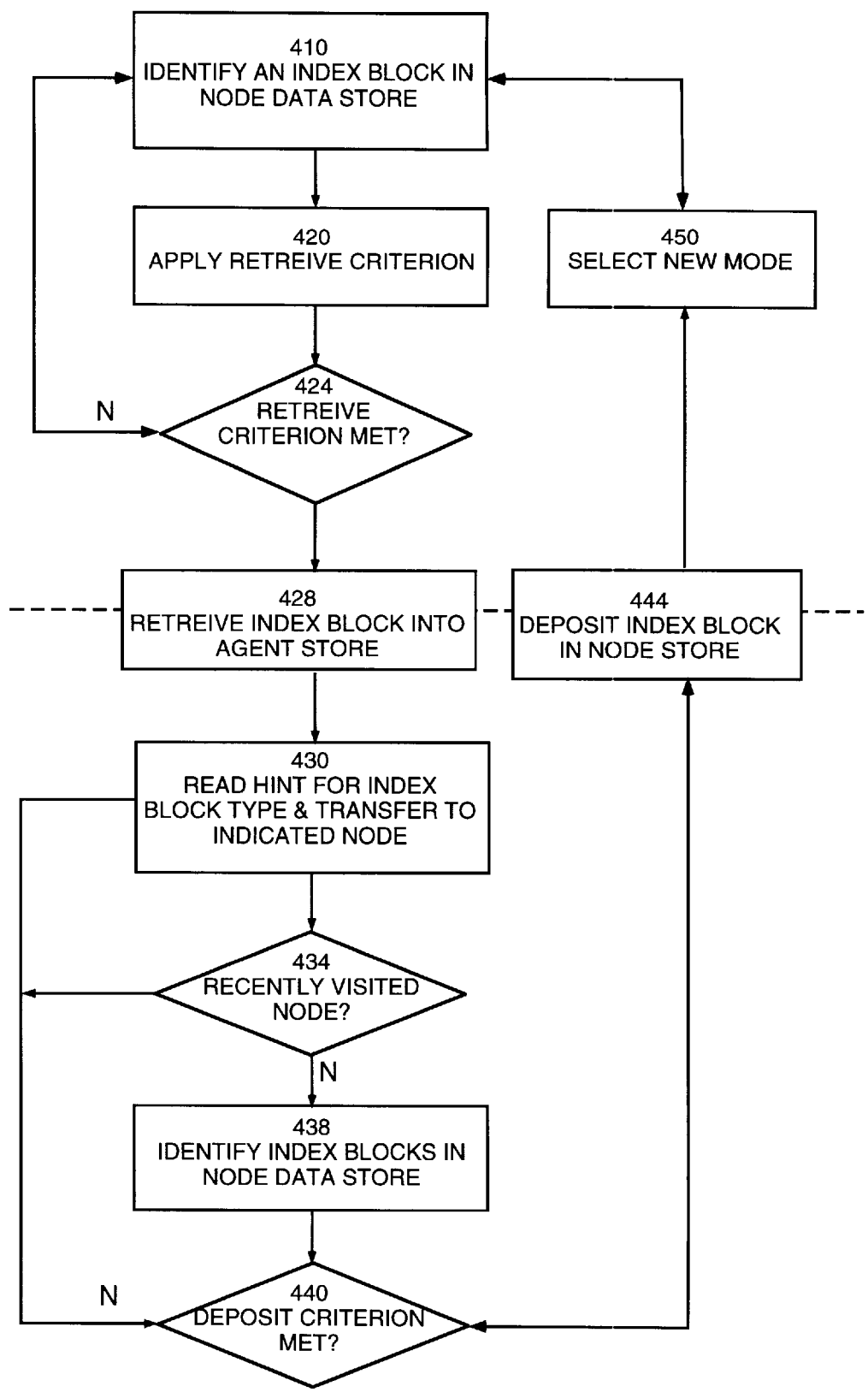
FIG. 4 is a flow chart indicating one embodiment of a method implemented by an autonomous index agent to manage index data on a computer network in accordance with the present invention.

Referring now to FIG. 4, there is shown one embodiment of a method 400 implemented by index agents 120 for managing a distributed database in accordance with the present invention. When an unloaded index agent, i.e. an agent carrying no index block data, arrives at a network node, it identifies 410 an index block in the data store, and applies 420 a retrieve criterion to the index block. If the criterion is met 424, the index agent retrieves 428 the index block from the node data store. Otherwise, it repeats the process with another index block.

One embodiment of the retrieve criterion retrieves index blocks with a probability that is inversely proportional to the number of index blocks in the node store having the same type as the identified index block. This may be implemented, for example, by programming the index agent to determine the ratio between a randomly selected number between 0 and 1 and the number of index blocks in the nodes store having the same type as the identified index block (block number). If the result is greater than one, the retrieve criterion is deemed to be met, and the index block is transferred to the index agent. Otherwise, the index block is left in the node data store.

Once the index agent has retrieved 428 an index block, it selects 430 a new node. Selection step 430 includes reading the direction store (112) for direction hints to a new node, writing its time marker to the time store (114), and accessing the appropriate network link.

At the new node, the loaded index agent reads the time store (114) to determine 434 if it has been to the new node recently. If it has, the index agent repeats selection step 430 at the new node (read direction hints, write time, transfer). If it has not been to the new node recently, the index agent identifies 438 index blocks in the node's data store and applies 440 a deposit criterion. If the deposit criterion is met, the index agent deposits 444 the index block at the new node. If the deposit criterion is not met, the still loaded index agent repeats selection step 430, using the direction/time information at the current node.

Once it is unloaded, the index agent may select 450 a new node to visit. This may be done randomly or by application of some criterion to select the node. Alternatively, the agent may terminate.

One embodiment of the deposit criterion (step 440) deposits index blocks with a probability that is directly proportional to the number of index blocks in the node store having the same type as the loaded index block. This may be implemented, for example, by programming the index agent to determine the ratio between the number of index blocks in the nodes store having the same type as the index block in its store (block number) and a randomly selected number between 0 and this block number. If the result is greater than one, the deposit criterion is deemed to be met and the index block is transferred to the node data store. Otherwise, the agent repeats node selection step 430, using the direction/ time information in the current node.

The deposit and retrieval criteria in the disclosed embodiment use the first power of the block number. The effect of these criteria is that index agents deposit index blocks at nodes with a probability directly proportional to the block number at the node and retrieve index blocks from nodes with a probability that is inversely proportional to the block number at the node. However, these transfer criteria may be determined using any functional dependence that increases with the block number at the node.

Figure 5:
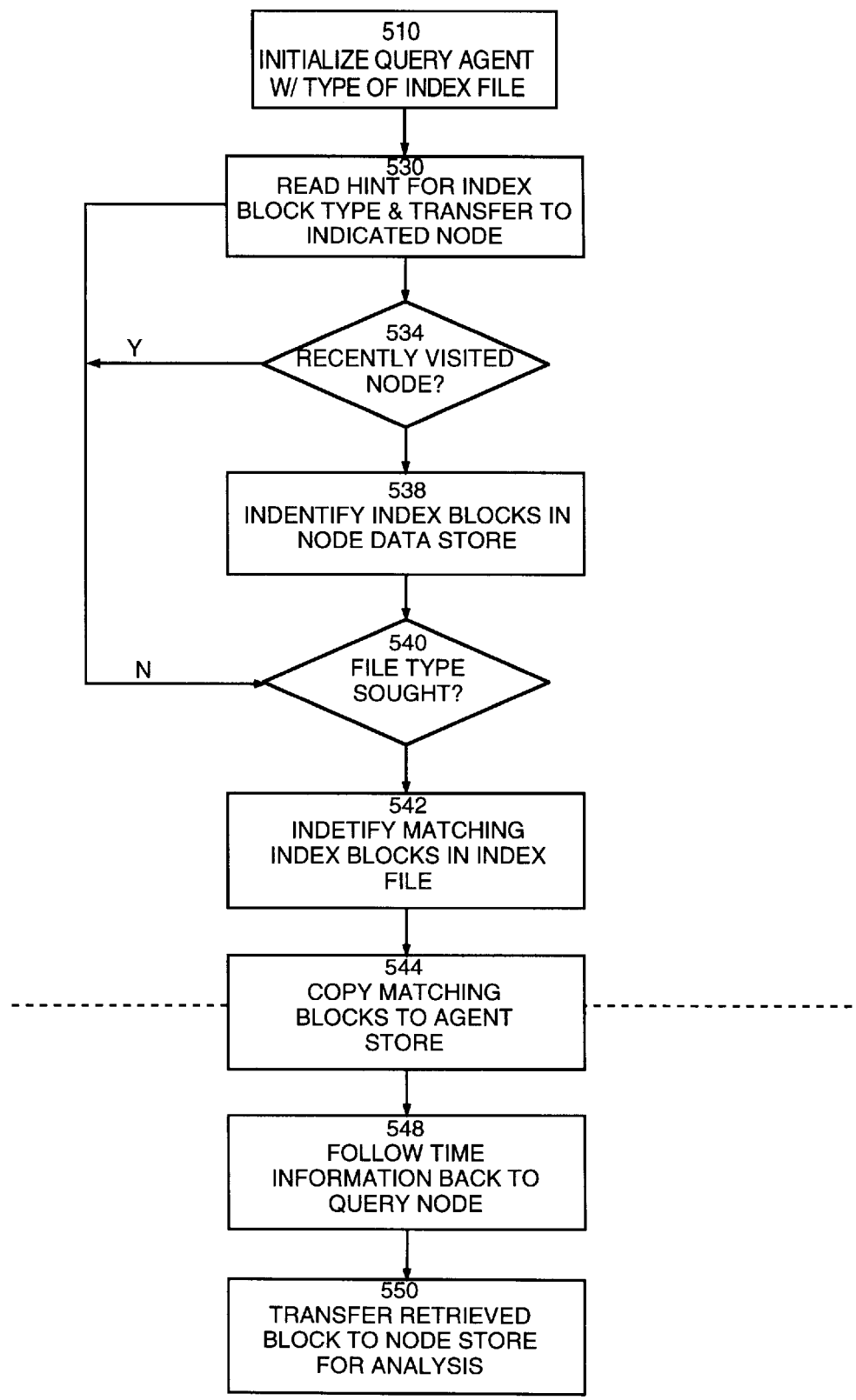
FIG. 5 is a flow chart indicating one embodiment of a method implemented by an autonomous query agent for identifying documents responsive to a query in accordance with the present invention.

Referring now to FIG. 5, there is shown one embodiment of a method 500 implemented by a query agent in accordance with the present invention. As noted in conjunction with FIG. 3, queries are analyzed into the different index fields they specify, and a query agent is initialized to locate the index file and identify documents having the value of the index field specified in the query. Thus, the query agent is initialized 510 at the originating node with the index file type and value specified in the query. The query agent selects 530 a new node to visit in search of the specified index file. Selection step 530 includes reading the direction store for direction hints to a new node, writing its time marker to the time store, and accessing the appropriate network link.

At the new node, the query agent checks the time store to determine 534 if it has recently visited the node. If it has, it returns to selection step 530 and selects a different node. If the query agent has not visited the new node recently, it identifies 538 any index files in the node's data store. If the index file type being sought 540 is stored at the node, the query agent reads 544 the index file entries and copies 546 into its store the document ID of each index block that matches the value specified in the query. The query agent can then retrace 548 it path back to the originating node and transfer the document IDs to the node store for analysis. If the index file sought 540 is not at the current node, the query agent repeats selection step 530 to select another nod to search.

Because of the probabilistic search methods employed by the indexing system of the present invention, there is no guarantee that the multiple replicas of index files will be updated with each new index block. As a result, multiple query agents initialized for the same index file type, may return inconsistent results. These inconsistencies may be identified and resolved for each index file that is the subject of a query.

In one embodiment of the invention, the originating node initializes multiple query agents for each index file type sought, to test the consistency of different replicas of an index file. For each query processed, multiple query agents are initialized for each index file being sought, and the index files are flagged (with time dependent markers) once they have been searched. This prevents the different query agents from searching the same version of the index file, and the query agents are forced to respond with results from different versions of the index file. The results derived from the different index file versions can be compared to identify any inconsistencies.

A number of methods may be used to eliminate inconsistencies identified among the versions of an index file. One such method time stamps each index block, and any inconsistencies between the index blocks retrieved from different versions of an index file are resolved in favor of the most recently stored index block. Another method takes the result returned by the majority of query agents as the correct result. Other methods, including combinations of the time stamp and majority method, may be employed to resolve inconsistencies between searched data files.

Balance agents are employed in one embodiment of the present invention to ensure that none of the nodes is overloaded. These agents visit different network nodes and determine the size of any index files identified at the visited nodes. When a balance agent determines that the size of an index file exceeds a maximum value, it retrieve a portion of the index file, moves it to a new node, and deposits the retrieved portion of the index file at the new node. The balance agent may also update information (direction hints, time markers) in the interface agents of the effected nodes to reflect the transfer.

Figure 6:
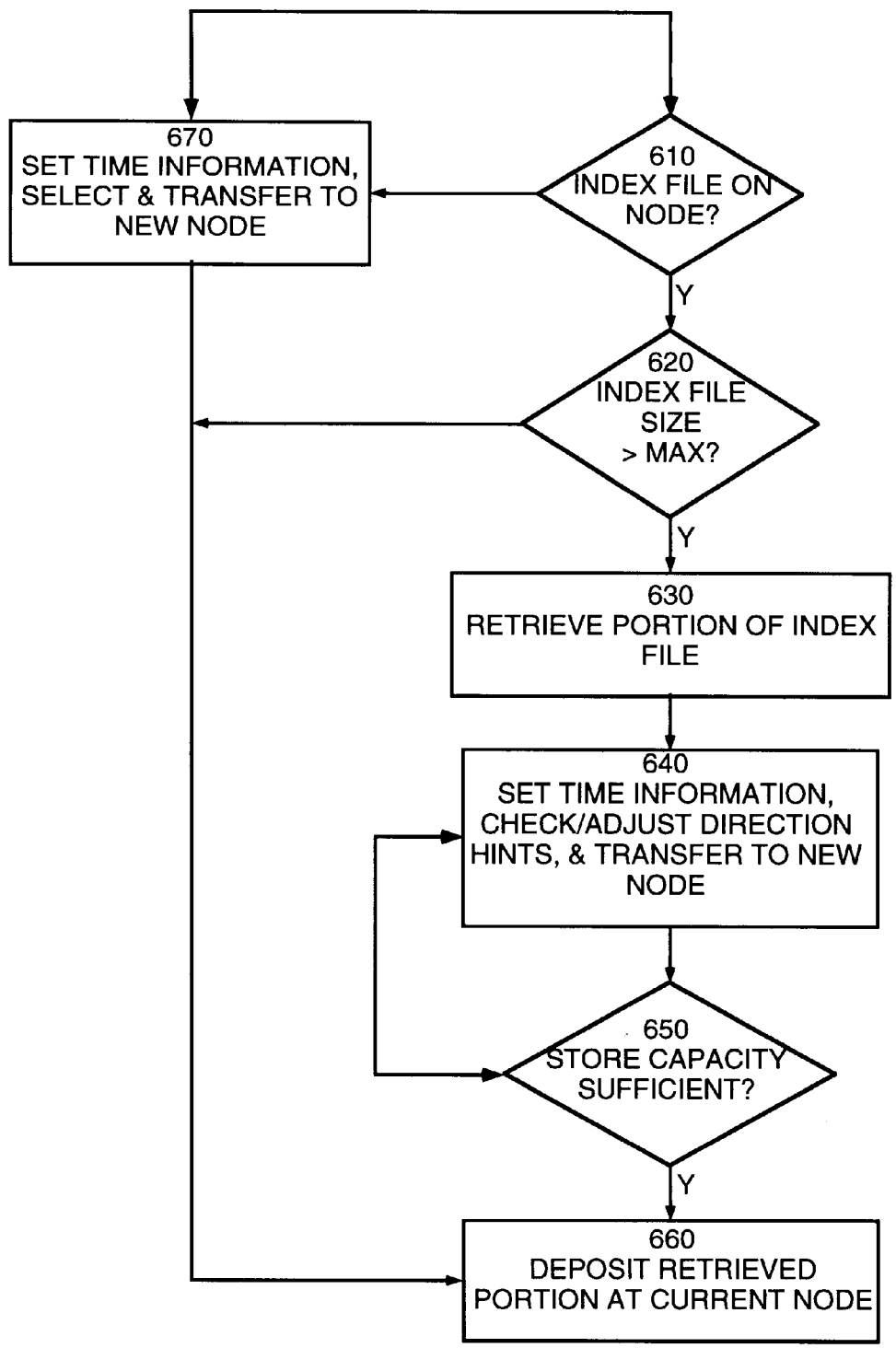
FIG. 6 is a flow chart indicating one embodiment of a method implemented by an autonomous balance agent for regulating the size of index files in accordance with the present invention.

Referring now to FIG. 6, there is shown one embodiment of a method 600 implemented by autonomous balance agents to balance the load on the nodes of the computer network. Initially, the balance agent determines 610 whether an index file is being aggregated at the current node. If an index file is present 620, the balance agent determines 620 whether the size of the index file exceeds a maximum value. The maximum value used may be set in a number of ways. For example, it may be a fixed percentage of the memory available on the computer node, or it may be a fixed value for all nodes. If the maximum value is exceeded, the balance agent retrieves 630 a portion of the index file, e.g. half the entries (index blocks) in the index file, and selects 640 a new node to visit.

Selection step 640 may comprise a number of operations, including updating time information, .e.g. setting the balance agent's time dependent marker, in the agent interface, updating the direction hint for the index file type to indicate the node the agent will visit with the retrieved index file portion, and transferring to the next node. The balance agent may also check direction hints for the index file type to avoid visiting a node that already includes data from the index file or one of its replicas.

At the new node, the balance agent checks 650 the data store capacity, and if its sufficient, it deposits 660 the portion of the index file it retrieved. The balance agent then selects 670 a new node to visit. Selection step 670 includes updating the transfer information in the agent interface to reflect the presence of the index file portion. If at step 650, the balance agent determines that the data store capacity is insufficient, selection step 640 is repeated at the current node.

Replicating agents are employed in one embodiment of the invention to make the distributed indexing system robust against the loss of one or more nodes on which index files are stored. These agents visit the nodes of the network and track the number of copies of each index file identified on the visited nodes. If this number is less than a selected minimum value for any of the index file types identified, a replicating agent retrieves a copy of the file and deposits it at a new node. The replicating agent also updates information (direction hints, time dependent markers) in the effected agent interfaces to reflect the presence of the new replica.

Figure 7:
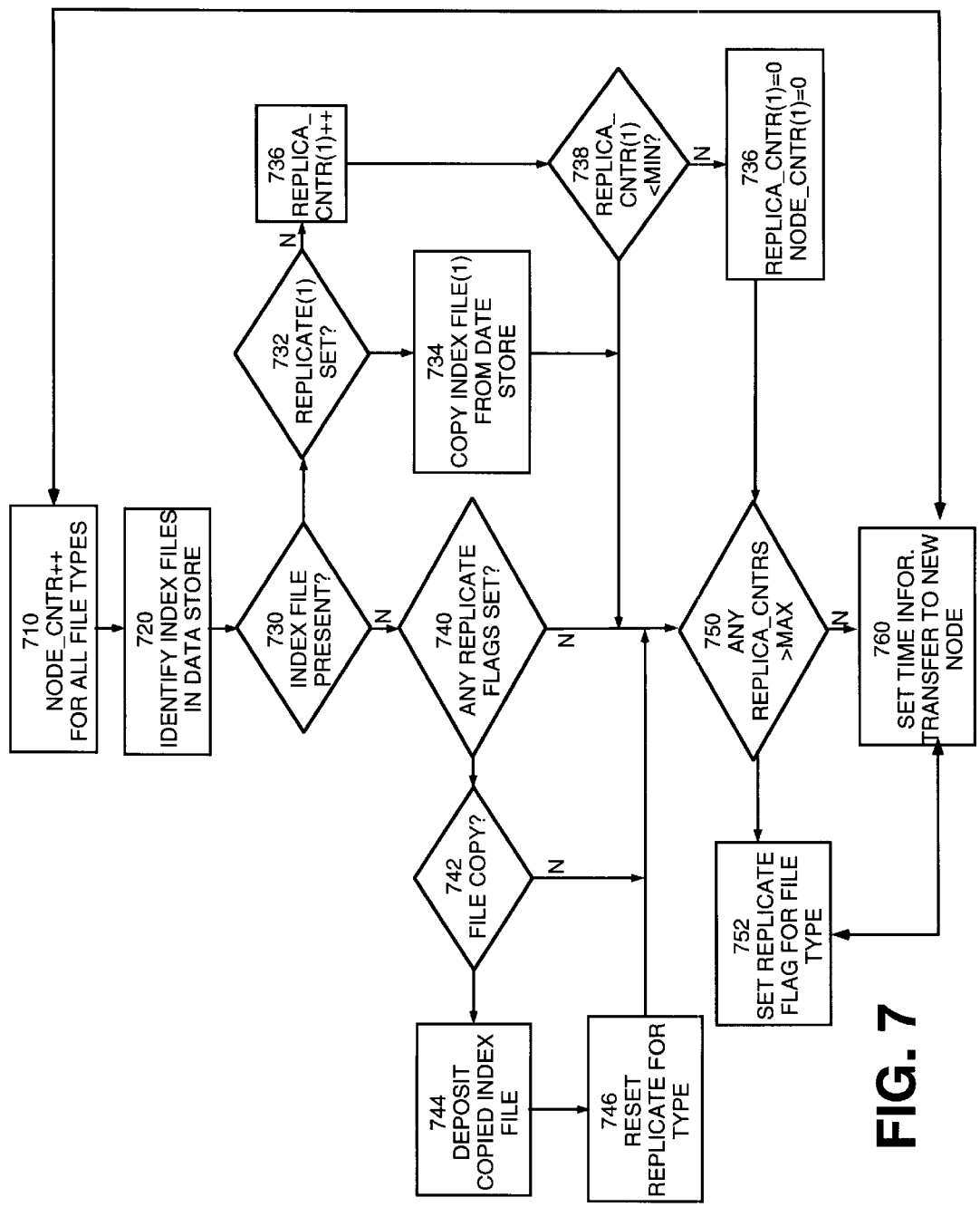
FIG. 7 is a flow chart indicating one embodiment of a method implemented by an autonomous replicating agent for replicating index files in accordance with the present invention.

Since there is no central coordinating computer to direct the replicating agents' movement among network nodes, sampling methods may be employed to track the number of replicas of each index file. For example, if there are 50 nodes in the network and each index file type should have five replicas, the replicating agent can be programmed to generate new replica of an index file if it fails to detect at least one index file of a given type after visiting 10 nodes. This can be done using counters for each index file type to track the number of nodes visited and the number of replicas detected in these visits Referring now to FIG. 7, there is shown one embodiment of a method 700 implemented by an autonomous replicating agent for maintaining a minimum number of replicas for each type of index file in the system. Index file types are indicated in parenthesis, i.e. node_cntr(i), following the various counters, where counters for a specific index file type are adjusted. No type indicator is shown if counters are adjusted for all index file types.

When the replicating agent arrives at a node, it increments 720 the node_cntrs for all index file types and identifies 710 any index files in the node's store. If an index file is present 730, e.g. index file type (i), the replicating agent determines 730 whether a replicate flag is set for the index file type, e.g. replicate(i)=1. If so, the replicating agent copies 734 the index file type to its data store to create a replica of the index file at a new node. If replicate(i) is not set, replica_cntr(i) is incremented 736 and compared 738 with the minimum number of replicas required. If replica_cntr(i) reaches the minimum 738, replica_cntr(i) and node_cntr(i) are reset to zero 739, and the node_cntrs for all index file types are checked 750 against a maximum value, e.g. 10 node visits in the preceding example.

A node_cntr(j) reaches the maximum value 750 when its corresponding replica_cntr(j) does not reach the minimum number of replicas before the maximum number of nodes has been visited. In the example, j-type index file doe not have sufficient copies. Accordingly, replicates) is set 752 and a new node is selected 760.

If at step 730, the replicating agent determines that no index file is present, it determines 740 if any replicate flags are set. If replicate(j) is set and the replicating agent has a copy of index file(j) 742, it deposits 744 the copy and resets 746 replicate(j) to zero. If the replicating agent has not copies index files(j) yet, it moves to step 750.

There has thus been provided a system and method for distributing and managing index and data information among the nodes of a computer network, through the collective actions of autonomous agents. Each agent transfers itself among the nodes of a computer network and implements a particular function according to the conditions it identifies at the nodes. Different classes of agents implement different functions. These functions include criteria, dependent on conditions identified at a network node, that are selected to produce an emergent coordination from the independent activities of the various autonomous agents.

Persons skilled in the art, having read this disclosure, will recognize that there are many ways to implement the indexing and distribution system of the present invention, including the functions of index, query, balance, and replicating agents. The configuration of agent interface 110 and methods 400, 500, 600, and 700 are merely exemplary and the present invention is limited only by the following claims.

What is claimed is:

1. A system for managing an index comprising index files distributed over the nodes of a computer network, the system comprising:

an agent interface on each node of the network, each agent interface including an interface package to provide access to resources on the node;

a data store on each network node capable of storing one or more index blocks; and a plurality of autonomous index agents, each index agent being capable of moving among the network nodes to transfer index blocks among the data stores of the network nodes according to a transfer criterion selected to aggregate index blocks of a type on one or more nodes of the network.

2. The system of claim 1, further comprising one or more autonomous query agents, each query agent being capable of moving among the network nodes to locate an index file having a specified type, compare the index blocks of the index file with a specified value, and copy one or more index blocks having the specified value.

3. The system of claim 1, further comprising one or more autonomous balance agents, each balance agent being capable of moving among the network nodes to locate index files, compare a size of the located index file with a selected maximum size, and transfer a portion of the index file to a new node when the size of the index file exceeds the selected maximum size.

4. The system of claim 1, further comprising one or more autonomous replicating agents, each replicating agent being capable of moving among the network nodes to monitor a number of replicas of an index file and generate a new replica of the index file when the monitored number is less than a selected minimum number of replicas.

5. The system of claim 1, wherein the agent interface includes memory locations to store direction information on index files and timing information on the one or more autonomous index agents.

6. A method implemented by each of a plurality of autonomous agents to distribute data among a plurality of networked nodes, the method comprising:

identifying an index block at a first node of the network;

retrieving the index block, when a retrieve criterion is met;

moving to a second node of the network; and adding the index block to an index field at the second node, when a deposit criterion is met, wherein the retrieve and deposit criteria are selected to aggregate index blocks of a given type on a network node, when the criteria are applied at each network node visited by the autonomous agents.

7. A method for managing an index that is distributed over a network of nodes, each of which includes a data store and an agent interface for executing agents received through the network, the method comprising:

detecting an agent at the agent interface of a network node; and executing the agent to;
evaluate an index block transfer criterion; and
transfer an index block between the agent and the data store with a probability related to a number of index blocks already in the data store.

8. The method of claim 7, wherein executing the agent to transfer an index block comprises;

executing the agent to transfer the index block to the data store when the agent includes the index block.

9. The method of claim 8, wherein executing the agent to transfer the index block to the data store comprises executing the agent to:

identify an index block type for the included index block;

determine a number of index blocks in the data store having the identified index block type; and deposit the index block in the data store when the number of index blocks exceeds a statistically determined threshold.

10. The method of claim 7, wherein executing the agent to transfer an index block comprises executing the agent when the data store includes the index block, to:

determine a number of index blocks in the data store having a selected index block type; and retrieve the index block from the data store when the number of index blocks is less than a statistically determined threshold.

11. The method of claim 7, wherein executing the agent further causes the agent to retrieve hint information on a next node to be visited and transfer itself to the indicated next node.

12. A method for managing an index that is distributed over a network of nodes, each of which includes a data store and an agent interface, the method comprising:

detecting an agent at the agent interface of a network node; and executing the agent to evaluate an index block transfer criterion and transfer an index block between the agent and the data store when the index block transfer criterion is met; and providing a hint to direct the agent to a next node indicated by the transferred index block.

13. The method of claim 12, wherein executing the agent comprises:

executing the agent to evaluate a deposit criterion when the agent includes an index block and to deposit the index block in the data store when the deposit criterion is met; and executing the agent to evaluate a retrieve criterion when the agent does not include an index block and to retrieve an index block from the data store when the retrieve criterion is met.

14. The method of claim 13, wherein evaluating the deposit criterion comprises:

identifying an index block type for the included index block;

determining a number of index blocks in the data store having the identified index block type; and depositing the index block in the data store when the number of index blocks exceeds a statistically determined threshold.

15. The method of claim 13, wherein evaluating a retrieval criterion comprises:

determining a number of index blocks in the data store having a selected index block type; and retrieving the index block from the data store when the number of index blocks is less than a statistically determined threshold.

16. A method implemented by an independent agent to distribute index data over a plurality of network nodes, the method comprising:

determining a number of index blocks of a given type at a first node;

retrieving one or more of the index blocks when the number of index blocks is less than a threshold value; and moving to a second node of the network.

17. The method of claim 16, wherein moving to the second node comprises:

reading a direction hint the first node; and moving to the second node indicated by the direction hint.

18. The method of claim 16, further comprising:

determining a number of index blocks having the given index type at the second node; and transferring the retrieved index block to the second node when the number exceeds a threshold value.

19. A method for managing an index that is distributed over a plurality of network nodes, the method comprising:

identifying an index block at a first node of the network;

transferring the index block to an agent, when a number of similar index blocks at the first node meets a retrieve criterion;

transmitting the agent to a second node of the network; and adding the index block to an index field at the second node, when a number of similar index blocks at the second node meets a deposit criterion.

20. The method of claim 19, wherein transferring comprises:

executing the agent in an environment provided at the first node to compare the number of similar index blocks at the first node with a threshold value and retrieve the index block to the agent when the number is less than the threshold value.

21. The system of claim 1, wherein the transfer criterion biases the autonomous agents to retrieve index blocks of a given type from nodes that have relatively few such index blocks and deposit them at a node that has relatively many index blocks of the given type.

22. The system of claim 5, wherein an autonomous index agent uses the direction information stored in the memory location of a current node to determine which network node to visit next.

23. The system of claim 5, wherein an autonomous index agent uses the timing information stored in the memory location of a current node to determine whether to access the data store of the current network node.

24. The method of claim 6, wherein moving to a second node of the network comprises:

reading hint information in the first node of the network; and moving to a second node of the network that is indicated by the hint information.

25. The method of claim 6, wherein identifying an index block at a first node comprises:

checking a time marker at the first node; and identifying the index block at the first node if the time marker indicates the autonomous agent has not recently visited the first node.

26. The method of claim 25, wherein the autonomous agent moves to a third node if the time marker indicates that it has recently visited the first node.

27. The method of claim 11, wherein retrieving hint information further comprises identifying a next node at random, if no destination node is associated with the index block, and moving to the randomly identified next node.

28. A distributed index system comprising:

a network of nodes, each node having a data store capable of storing one or more blocks of index data; and a plurality of independent agents, each agent being programmed to sample the nodes of the network and, at each network node it visits, to transfer a block of index data to or from the data store with a probability determined by a number of similar index blocks in the data store.

29. The distributed index system of claim 28, wherein an index agent holding a block of index data determines a number of similar index blocks in a node's data store and transfers the index block to the data store when the number exceeds a threshold value.

30. The distributed index system of claim 29, wherein the threshold value is determined statistically.

31. The distributed index system of claim 28, wherein an index agent determines a number of index blocks of a given type in a node's data store and retrieves one or more of the index blocks when the number is less than a threshold value.

32. The distributed system of claim 31, wherein the threshold value is determined statistically.

33. The distributed system of claim 28, wherein each independent agents samples the network nodes by identifying a direction hint at a node it is currently sampling and transferring itself to the node indicated by the direction hint.

34. The distributed system of claim 33, wherein the direction hint indicates a randomly selected node.

35. The distributed system of claim 33, wherein the direction hint indicates a node according to an index block transfer implemented by the agent at a node it is currently sampling.

36. A system comprising:

a plurality of network nodes, each node having a data store capable of storing index data; and a plurality of independent agents, each agent being capable of moving among the network nodes to sample the stored index data and redistribute selected blocks of the sampled index data according to a statistical criterion.

37. The system of claim 36, wherein each agent identifies a number of index blocks of a given type that are stored at a node and applies the statistical criterion to transfer index blocks of the type between the agent and node.

38. The system of claim 37, wherein the statistical criterion is a randomly selected threshold value that is compared with the identified number of index blocks.

39. The system of claim 36, further including a query agent initialized to indicate a value for a given index block type, the query agent being capable of moving among the network nodes to locate index blocks of a given type having the indicated value.

* * * * *

UNITED STATES PATENT AND TRADEMARK OFFICE
CERTIFICATE OF CORRECTION

PATENT NO.   : 5,963,944
DATED        : October 5, 1999
INVENTOR(S)  : Adams

It is certified that error appears in the above-identified patent and that said Letters Patent is hereby corrected as shown below:

Column 13,
Line 18, before "the first node", insert -- in --.

Signed and Sealed this

Eighth Day of July, 2003

JAMES E. ROGAN
*Director of the United States Patent and Trademark Office*